Patented Apr. 25, 1933

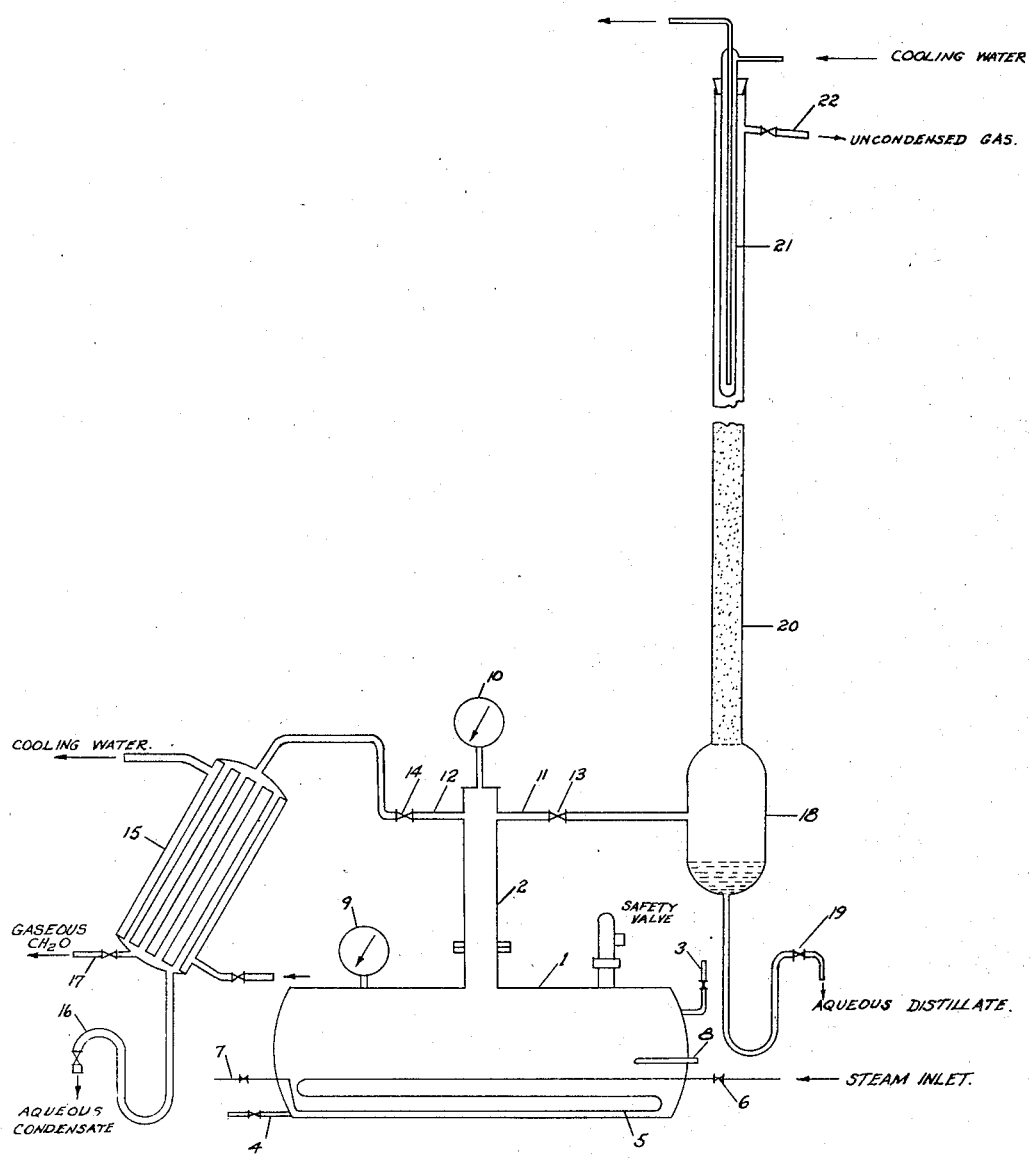
FIG. I.

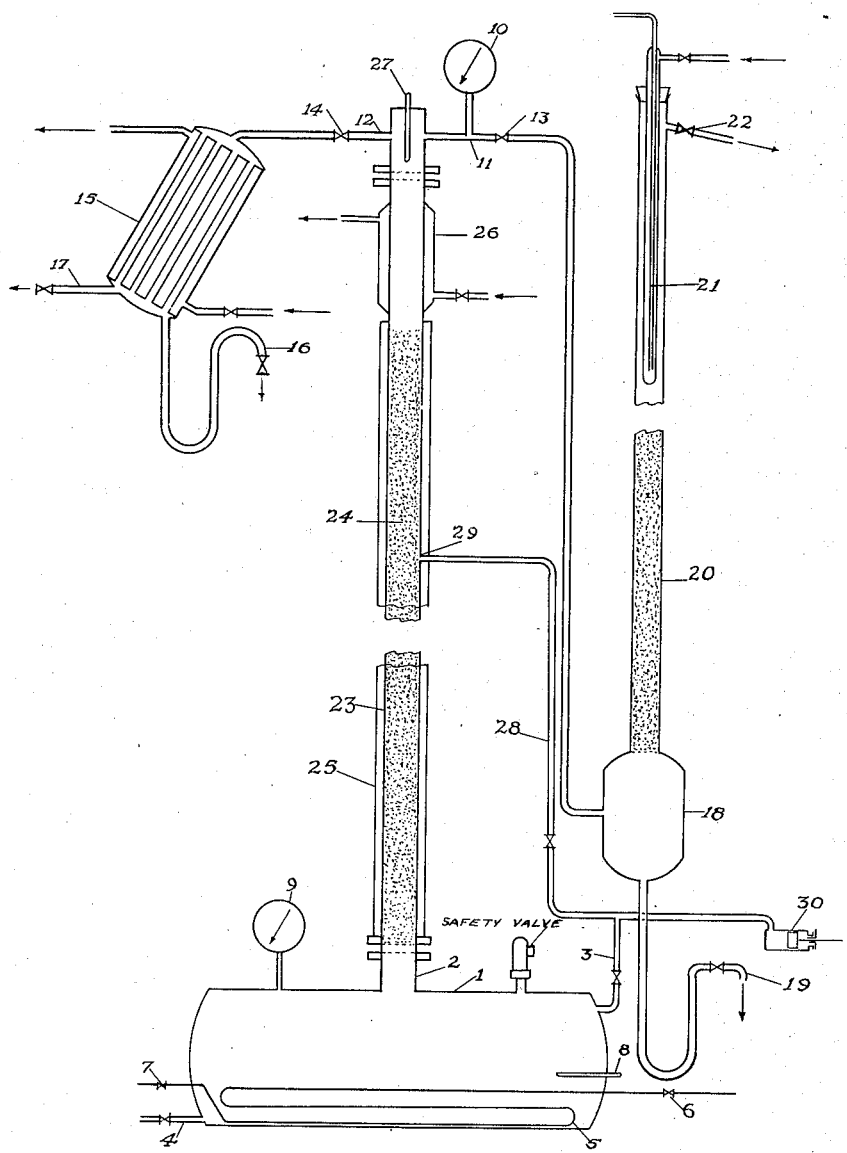
FIG. II

1,905,033

UNITED STATES PATENT OFFICE

HARLAN A. BOND, OF METUCHEN, NEW JERSEY, ASSIGNOR, BY MESNE ASSIGNMENTS, TO THE ROESSLER AND HASSLACHER CHEMICAL COMPANY, OF NEW YORK, N. Y., A CORPORATION OF DELAWARE

CONCENTRATION OF FORMALDEHYDE SOLUTIONS

Application filed December 9, 1927. Serial No. 238,879.

This invention relates to the distillation of aqueous formaldehyde solutions, and has for its object the obtaining of substantially anhydrous formaldehyde or the preparation of concentrated aqueous formaldehyde solutions of U. S. P. strength or higher from dilute aqueous solutions.

It is generally thought that in all aqueous solutions of formaldehyde at ordinary temperatures (0°–100° C.) there exists in addition to free $CH_2O$, several molecular forms of formaldehyde hydrates, $(CH_2O.XH_2O)$ and/or polymers of $CH_2O$, as $(CH_2O)_x$. The vapor pressure of the single $CH_2O$ molecule is higher than that of its polymers or hydrates. The boiling point of anhydrous $CH_2O$ is given as $-21°$ C. while paraform melts around 160°–170° C. and sublimes readily at slightly higher temperatures. Aqueous solutions of formaldehyde boil at a temperature between approximately 98° C. and about 100° C. at atmospheric pressure. Aqueous formaldehyde solutions can be distilled. Vapors distilled at low temperatures at atmospheric pressure from aqueous formaldehyde solutions contain little or no anhydrous $CH_2O$.

It has been found that the straight distillation (i. e. with no rectifying effect such as a fractionating column) of a 30% to 33% formaldehyde solution produces practically no change in the formaldehyde concentration. In other words, such a solution when boiled at atmospheric pressure gives off a vapor which has substantially the same composition as the original solution. A similar treatment of solutions between 5% and 30% gives vapor which is somewhat richer in formaldehyde than the original, and solutions stronger than 33% give a distillate which is equal to, or weaker than the original solution. These results can be explained by assuming that in the dilute solutions relatively more of the formaldehyde is in the form of the simpler hydrated or polymerized molecules and therefore more volatile.

I have discovered that concentrated formaldehyde solutions can be distilled from dilute aqueous formaldehyde solutions, if the distillation is carried out at temperatures above the atmospheric pressure boiling temperature. Such temperatures are conveniently obtained by conducting the distillation under moderate pressures. Thereby, I obtain vapor relatively rich in anhydrous unhydrated $CH_2O$. The desired temperature can also be obtained without subjecting the solution to increased pressure.

I have further discovered that when it is attempted to recover from such a distillation vapors relatively rich in anhydrous $CH_2O$, special difficulties arise from the clogging of the apparatus with paraform. This difficulty defeats the main object of the invention which is to recover directly a formaldehyde solution of any desired higher concentration, without loss of anhydrous $CH_2O$. Owing to the relatively large amount of anhydrous $CH_2O$ in the vapors from the still, I find it possible to condense the hydrous or hydrated vapors without forming paraform, and directly recover substantially anhydrous $CH_2O$ gas. Where only aqueous formaldehyde solution is desired, the anhydrous gas can be absorbed in the condensate.

I prefer to reabsorb the formaldehyde gas in the condensed aqueous distillate, thereby securing a larger quantity of solution having a specified high formaldehyde content, i. e. I secure a fortification of the dilute portions of the distillate.

In short, I distill under elevated temperature, preferably with pressure, condense and collect a predetermined amount of the distillate, and, before this is cooled, reabsorb the gaseous $CH_2O$ therein, before it polymerizes to paraform. Operating thus I have obtained upwards of 90–95% of the formaldehyde from a 25% by weight aqueous solution. This was in the form of a 42% by weight distillate by a single pressure distillation at 4–5 atmospheres and over a temperature range of 130–145° C. The final concentration can be increased by interrupting the distillation at an earlier period. Thus, over 55% of the formaldehyde from a 25% solution was recovered as a distillate containing 62% by weight of formaldehyde.

Apparatus suited for applying my invention is illustrated diagrammatically in the accompanying drawings wherein Figure I shows one form and Figure II is a modified form. In these drawings the same number refers to the same or analogous parts.

Referring specifically to Figure I, 1 is a still provided with a still head 2. Still 1 is suitably insulated to retain heat; still head 2 may also be insulated if desired. 3 is an inlet to the still for the intermittent or continuous introduction of dilute formaldehyde solutions, and 4 is the outlet for a spent solution. 3 and 4 are provided with the necessary valves and supply means. Inside the body of the still is placed steam heating coil 5 provided with steam control valves 6 and 7. 8 is a thermometer or other device for indicating the temperature in the still. 9 is a pressure gauge connected to the still in the vapor zone and 10 is a pressure gauge located at the top of the distilling head. The still head 2 is provided with two vapor exits 11 and 12, either of which may be used as desired by the proper opening and closing of pressure expansion valves 13 and 14.

Vapor exit 12 leads to a condenser 15 where an aqueous condensate may be removed from the vapor coming from the still, and more or less separated from substantially anhydrous $CH_2O$ which does not condense on moderate cooling as by ordinary cooling water or brine. The aqueous condensate is removed from the condenser through trap outlet 16 and the gaseous fractions pass off through 17. Instead of allowing expansion from the still pressure to atmospheric pressure to take place in valve 14, expansion may be allowed to occur after the vapors have passed through the condenser 15, for example, at a suitable point in lines 16 and 17. This arrangement allows the condensation in 15 to take place under pressures above atmospheric.

Vapor exit 11, which may be used by closing valve 14 and opening expansion valve 13, leads to a collecting reservoir 18 having a liquid draw-off 19. The top of the collecting chamber 18 connects with an absorber 20. This absorber is preferably filled with inert packing of such a nature as to create extended surfaces of liquid when said liquid is flowing downward in the absorber. 20 is here shown as a packed absorbing column, but may take any other form suited for causing rapid absorption of gases in liquid. At the top of the absorbing section 20 is a reflex condenser 21 which may be supplied with any cooling means such as water, brine, etc. as desired. When the distilled vapors coming through 20 come in contact with reflux 21, the aqueous formaldehyde is condensed, and caused to flow downward through the absorber 20, wherein the liquid comes in intimate contact with the ascending vapors and absorbs or hydrates the anhydrous vapors passing upward. Any gases passing the reflux 21 pass out of the column at 22 and may be led to a second absorber, or wasted, as desired. As in the case where the aqueous and gaseous portions were separately collected, it is here possible to make valve 13 merely a shut-off valve, and to place the pressure expansion valve on the gas vent 22, thus allowing absorption and condensation to take place under pressure.

Figure II contains essentially the same component structures, as is noted by the numbers given. In this case, however, the still head is in the form of an extended column 23. This column may be merely an empty extended zone, or, as shown in the sketch it may be filled with loosely packed inert material 24, or materials which may act as a catalyst, such as copper, for the breaking down of the higher formaldehyde polymers or hydrates. The column 23 is preferably surrounded by heat retaining material 25. At the top of column 23 is a reflux condenser 26. This reflux may be operated at any temperature desired or entirely omitted. At the top of the column 23 above the reflux 26 is placed a temperature indicating means 27. The supply of dilute formaldehyde to the apparatus of Figure II may be accomplished as in the case of Figure I through pipe 3, intermittently or continuously, or the feed may be through the pipe 28 to any desired point in column 23, for example, as shown at point 29. The feed here is shown as being by means of a pump 30.

The operation of my process is essentially the same regardless of which form of apparatus is used. Dilute formaldehyde is supplied to the still as noted above. Before commencing distillation, air is preferably flushed out of the system by means of an inert gas, such as nitrogen. The still inlet and outlet, and the pressure expansion valves are then closed. Steam is now admitted to coil 5 by opening valves 6. The steam coil exit valve 7 is controlled so as to regulate the flow of steam in accordance with the amount of heat required. When the solution in the still reaches a temperature of about 130 to 140° C., the gauge 9 on the still and gauge 10 will register 50–60 lbs. pressure, and vapors may now be obtained through the valve lines 11 or 12 as mentioned above.

For example, for the production of all the formaldehyde distillate as an aqueous solution expansion valve 13 is opened to allow vapors from the top of the column to pass into the reservoir 18. In case the apparatus of Figure II is used, a small amount of water is allowed to flow through the jacket of the dephlegmator 26. In apparatus of Figure I, all of the vapors pass from the still into 18. The vapors from 18 pass upwards in the scrubber 20 and finally come into contact with reflux 21 where the aqueous vapors are condensed and flow down the column again into the scrubber. After the expansion valve has been adjusted so as to give the desired distillation rate, the pressure in the top of the column is kept constant by controlling the heating through coil 5.

The recovery of the distillate in absorber 20 requires close control in order to recover the anhydrous $CH_2O$ gas produced. The anhydrous $CH_2O$ appears to be only slightly soluble in cold water, but appears to dissolve readily in hot water, due to the ease of formation of a readily soluble hydrate, which is formed very slowly with cold water. It is therefore necessary to regulate the cooling water in 21 so as to maintain a warm condensate; for example, at 50° C. The absorber portion 20 is at all times at the boiling temperature of the distillate, i. e. 98–100° C.

When operating the scrubber under the above conditions practically no paraform deposits in the system, and only a trace of formaldehyde escapes through 22.

The distillate which collects in 18 is drawn off as desired. This may, for example, be drawn off as fractions to be combined later to give a product having the desired formaldehyde concentration, or it may be drawn off as a complete mixture containing the total distillate.

If it is desired to collect the aqueous formaldehyde separately from substantially anhydrous formaldehyde gas, the condensing-separating system shown in connection with the vapor outlet 12 may be utilized.

I have found that in operating a system as shown in Figure II, and converting all of the distillate to aqueous formaldehyde, high yields as noted above may be obtained, and that less than 5% of the original formaldehyde remains in the still by the time that ⅔ to ¾ of the initial charge has been distilled off. The temperature-pressure relation and distillate fractions recovered from such a distillation is shown in the following data table from a typical run.

4,269 grams of a formaldehyde solution containing 25.1% by weight of formaldehyde (1070 grams calculated as $CH_2O$) was placed in the still, and subjected to the pressure distillation for a period of two hours and a half. The temperature range during distillation was 135–140° C.; the pressure on the still was 50 lbs. throughout the major portion of the run, but dropped to 40 lbs. toward the end.

| Distillate fraction No. | Weight of fraction grams | Per cent by weight $CH_2O$ in fraction | Grams $CH_2O$ in fraction | Per cent of total $CH_2O$ recovered | Average per cent $CH_2O$ in combined distillate |
|---|---|---|---|---|---|
| 1 | 231 | 31.2 | 72 | 6.7 | 31.2 |
| 2 | 978 | 61.9 | 605 | 62.3 | 56.0 |
| 3 | 865 | 34.0 | 294 | 90.8 | 46.8 |
| 4 | 809 | 7.4 | 60 | 96.3 | 35.8 |

When the distillation was complete, the still contained 1380 grams of residue containing approximately 3.0% formaldehyde.

I claim:

1. The process comprising distilling aqueous formaldehyde solutions under such conditions that the vapors therefrom are at a temperature above the normal atmospheric boiling point of the solution and collecting the vapors therefrom as formaldehyde of greater concentration than that of said aqueous solutions.

2. The process comprising distilling aqueous formaldehyde solutions at a temperature above the normal atmospheric boiling point of the solution and at a pressure above atmospheric and collecting the vapors therefrom as formaldehyde of greater concentration than that of said aqueous solutions.

3. The process comprising distilling aqueous formaldehyde solutions under such conditions that the vapors therefrom are at a temperature above the normal atmospheric boiling point of the solution and condensing the aqueous portion of said distillate.

4. The process comprising distilling aqueous formaldehyde solutions at a temperature above the normal atmospheric boiling point of the solution and at a pressure above atmospheric and condensing the aqueous portion of said distillate.

5. The process comprising distilling aqueous formaldehyde solutions under such conditions that the vapors therefrom are at a temperature above the normal atmospheric boiling point of the solution and separately collecting substantially anhydrous formaldehyde gas and condensed aqueous formaldehyde solution.

6. The process comprising distilling aqueous formaldehyde solutions at a temperature above the normal atmospheric boiling point of the solution and at a pressure above atmospheric and separately collecting substantially anhydrous formaldehyde gas and condensed aqueous formaldehyde solution.

7. The process comprising distilling aqueous formaldehyde solutions under such conditions that the vapors therefrom are at a temperature above the normal atmospheric boiling point of the solution, condensing the aqueous portion of said distillate and absorbing gaseous formaldehyde in the condensate thus produced.

8. The process comprising distilling aqueous formaldehyde solutions at a temperature above the normal atmospheric boiling point of the solution and at a pressure above atmospheric condensing the aqueous portion of said distillate and absorbing gaseous formaldehyde in the condensate thus produced.

9. The process comprising distilling aqueous formaldehyde solutions under such conditions that the vapors therefrom are at a temperature above the normal atmospheric boiling point of the solution, condensing the aqueous portion of said distillate and absorbing therein gaseous formaldehyde produced by said distillation.

10. The process comprising distilling aqueous formaldehyde solutions at a temperature above the normal atmospheric boiling point of the solution and at a pressure above atmospheric condensing the aqueous portion of said distillate and absorbing therein gaseous formaldehyde produced by said distillation.

11. In a pressure distillation process the step which comprises absorbing gaseous formaldehyde in aqueous condensate from said distillation.

12. In a distillation process for concentrating aqueous formaldehyde, the step which comprises absorbing gaseous distilled formaldehyde in aqueous condensate from said distillation at such temperature as to hydrate the gaseous formaldehyde.

13. The process comprising distilling aqueous formaldehyde solutions under such conditions that the vapors therefrom are at a temperature above the normal atmospheric boiling point of the solution, passing the vapors thus produced through a column and collecting the vapors therefrom as formaldehyde of greater concentration than that of said aqueous solutions.

14. The process comprising distilling aqueous formaldehyde solutions under such conditions that the vapors therefrom are at a temperature above the normal atmospheric boiling point of the solution, passing the vapors over copper, and collecting the vapors therefrom as formaldehyde of greater concentration than that of said aqueous solutions.

15. The process comprising distilling aqueous formaldehyde solutions under such conditions that the vapors therefrom are at a temperature above the normal atmospheric boiling point of the solution, refluxing a portion of said vapors, and collecting the vapors therefrom as formaldehyde of greater concentration than that of said aqueous solutions.

16. The process comprising distilling aqueous formaldehyde solutions at a temperature above the normal atmospheric boiling point of the solution and at a pressure above atmospheric, passing the vapors thus produced over copper, and condensing the aqueous portion of said distillate and absorbing therein gaseous formaldehyde produced by said distillation.

17. The process comprising distilling aqueous formaldehyde solutions under such conditions that the vapors therefrom are at a temperature above the normal atmospheric boiling point of the solution, condensing and collecting a desired amount of the distillate, and, before this is cooled reabsorbing therein the gaseous formaldehyde produced by the distillation before it polymerizes to paraform.

18. The process comprising distilling aqueous formaldehyde solutions at a temperature above the normal atmospheric boiling point of the solution and at a pressure above atmospheric condensing and collecting a desired amount of the distillate, and, before this is cooled reabsorbing therein the gaseous formaldehyde produced by the distillation before it polymerizes to paraform.

19. The process comprising distilling aqueous formaldehyde solutions at a temperature above the normal atmospheric boiling point of the solution and at a pressure above atmospheric and collecting the vapors therefrom under pressure as formaldehyde of greater concentration than that of said aqueous solutions.

20. The process comprising distilling aqueous formaldehyde solutions under about four atmospheres pressure, and collecting the vapors therefrom as formaldehyde of greater concentration than that of said aqueous solutions.

Signed at Perth Amboy in the county of Middlesex and State of New Jersey this eighth day of December A. D. 1927.

HARLAN A. BOND.